Nov. 16, 1948.  I. A. KAMLOOKHINE  2,453,750
ENDLESS TRACK MECHANISM
Filed May 1, 1944  2 Sheets-Sheet 1
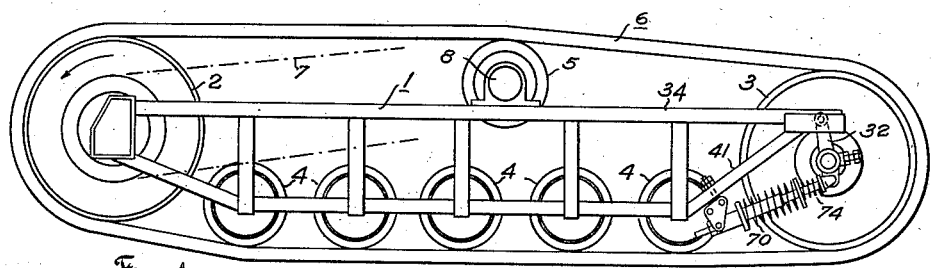
Fig. 1
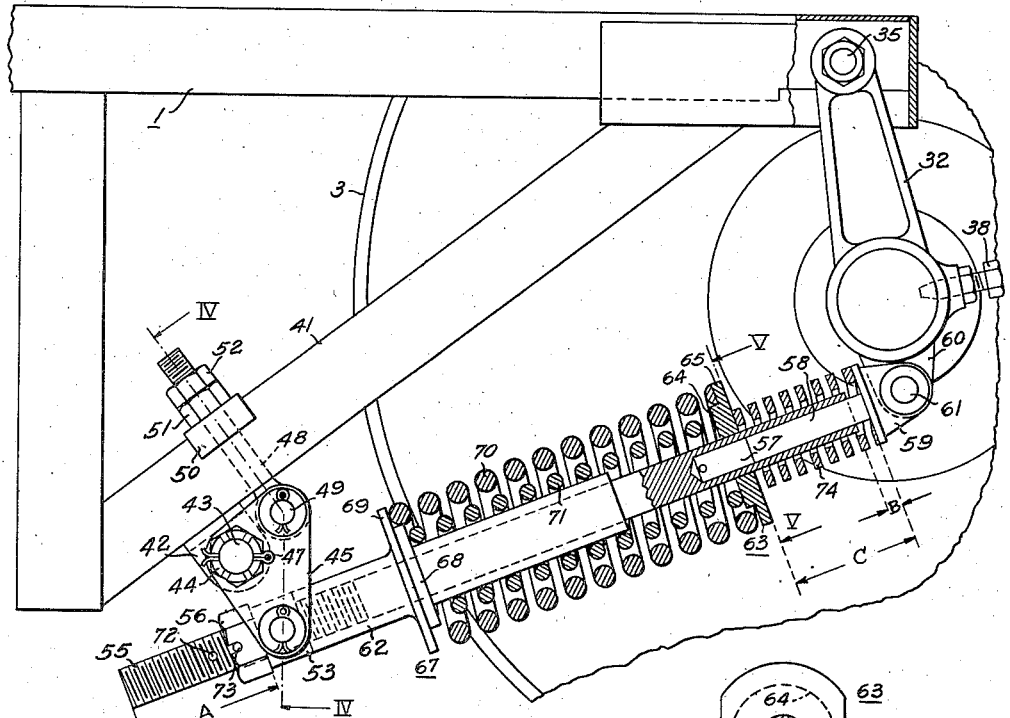
Fig. 2
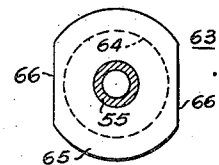
Fig. 5
Fig. 4
Inventor
I. A. Kamlookhine
by
Attorney Nov. 16, 1948.  I. A. KAMLOOKHINE  2,453,750
ENDLESS TRACK MECHANISM
Filed May 1, 1944  2 Sheets-Sheet 2

Inventor
I. A. Kamlookhine
by W. Gerold
Attorney

Patented Nov. 16, 1948

2,453,750

UNITED STATES PATENT OFFICE 2,453,750

ENDLESS TRACK MECHANISM

Igor A. Kamlookhine, Milwaukee, Wis., assignor to Allis-Chalmers Manufacturing Company, Milwaukee, Wis., a corporation of Delaware Application May 1, 1944, Serial No. 533,485

12 Claims. (Cl. 305—9)

The invention relates to self-laying track vehicles, and it is concerned more particularly with improvements in the construction and operation of the track-laying mechanisms for such vehicles.

In self-laying track mechanisms of the type in which an endless track belt is mounted for travel around a supporting frame by means of track supporting front and rear wheels, it has heretofore been usual to mount one of said wheels reciprocably on the supporting frame for movement relative thereto in track tensioning and track releasing directions, and to interpose a resilient backing unit between the frame and the reciprocable wheel, the principal purpose of said arrangement being to protect the mechanism against damage when a stone or other solid obstruction becomes lodged on the track belt and is forced to travel with the belt around the supporting frame, as is well known in the art.

Generally, it is an object of the invention to provide an improved self-laying track mechanism of the hereinabove mentioned character.

More specifically, it is an object of the invention to provide an improved self-laying track mechanism which lends itself to use in vehicles which are to be driven at relatively high speeds, such as thirty or forty miles per hour.

A further object of the invention is to provide an improved self-laying track mechanism adapted for high speed operation, as set forth hereinbefore, and in which the track belt will run smoothly, that is, without undue flopping or whipping, when it is driven at relatively high circumferential speeds relative to its supporting structure.

A further object of the invention is to provide an improved self-laying track mechanism which will be protected against damage in case a stone or other solid obstruction becomes lodged on the track belt, as has been stated hereinbefore, and whose ability to afford said protection will not be readily impaired by such causes as the formation of caked mud, ice, or rust.

A further object of the invention is to provide an improved self-laying track mechanism of the character set forth hereinbefore, in which wear and elongation of the track belt and wear of the wheels cooperating with the track belt will be automatically compensated to the extent of making frequent readjustments of the mechanism unnecessary.

A further object of the invention is to provide an improved mechanism for controlling the tension of an endless track belt, and more particularly to provide such a mechanism which will satisfactorily take care of the requirements for properly tensioning a track belt of the continuously flexible type, as for instance the well-known type of rubber track belt in which a continuously flexible belt member is formed by a series of rubber embedded steel cables.

The foregoing and other objects and advantages of the invention will become more fully apparent from the following description of a preferred embodiment of the invention shown in the accompanying drawings. Referring to the drawings, in which like reference characters designate the same or similar parts in the various views:

Fig. 1 is a side view of an endless track mechanism;

Fig. 2 is an enlarged side view, partly in section, of the track tensioning and release mechanism shown at a smaller scale in Fig. 1;

Fig. 4 is a sectional view on line IV—IV of Fig. 2;

Fig. 5 is a detail view, partly in section, on line V—V of Fig. 2; and

Figures 3, 6:
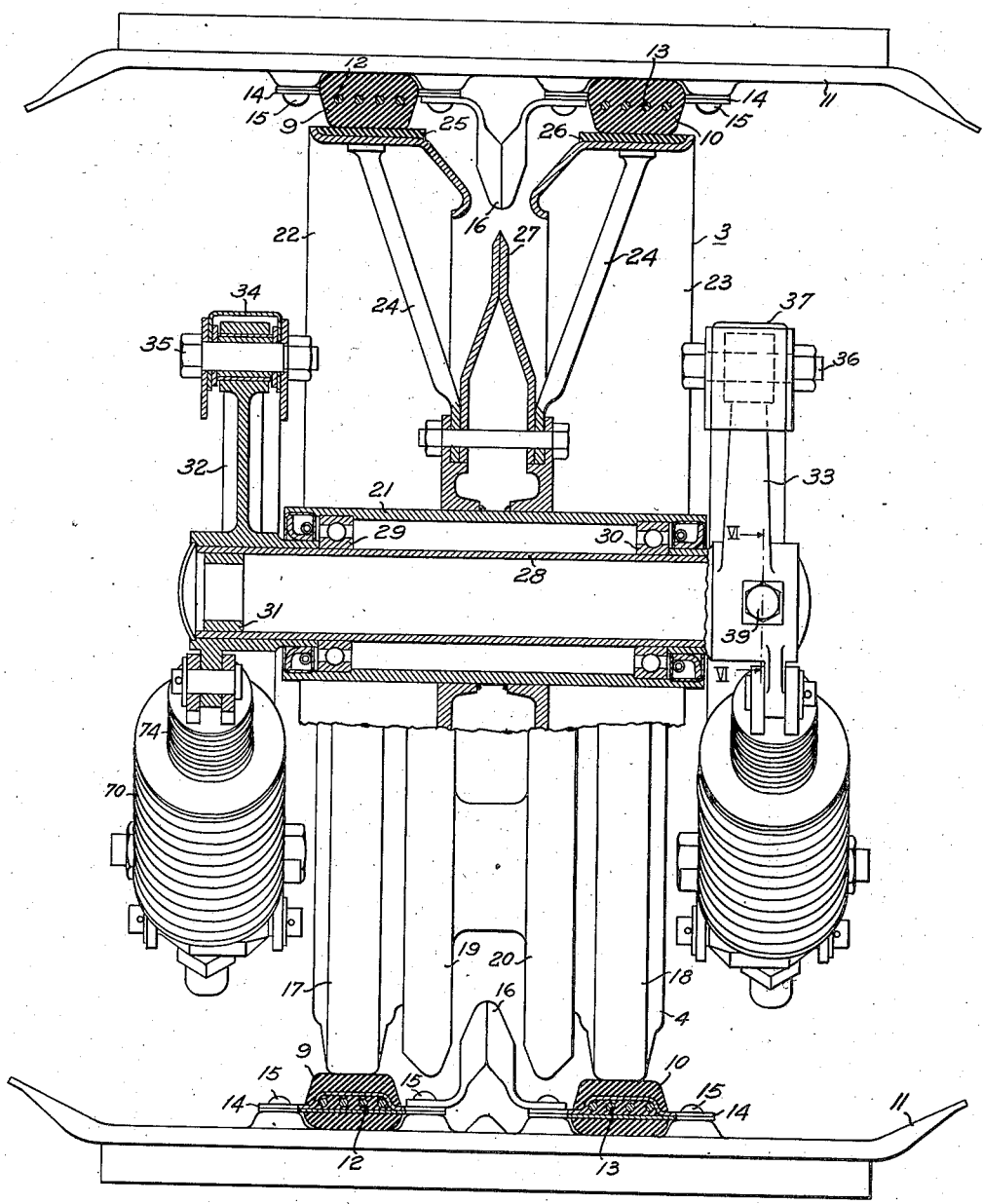
Fig. 3 is an end view, partly in section, of the mechanism shown in Fig. 2.
Fig. 6 is a sectional view on line VI—VI of Fig. 3.

The endless track mechanism shown in Fig. 1 comprises a track frame generally designated by the reference character 1, a track belt drive sprocket 2, a track idler 3, truck rollers 4, a track supporting roller 5, and an endless track belt 6 having suitable drive lugs (not shown) engageable by the drive sprocket 2. A transmission chain for driving the sprocket wheel 2 is indicated at 7, and a shaft is indicated at 8 on which the truck frame is pivoted to a vehicle body, not shown. Arranged coaxially with the shaft 8 is a driving sprocket (not shown) for the chain 7, and it will be understood that power is transmitted through the chain 7 to the track belt drive sprocket 2 for purposes of propulsion. The center of the sprocket 2 is retained at a fixed, preferably adjustable distance from the center of shaft 8, and any suitable construction may be employed for that purpose. Likewise, the truck rollers 4 and the track supporting wheel 5 may be assumed to be mounted on the truck frame in relatively fixed positions, the mechanism conforming in this respect with well known principles of construction and operation.

Fig. 3 shows a section through the track belt at the bottom of the figure and a corresponding section at the top of the figure. The bottom part of the idler 3 is broken away in Fig. 3 to show how the lower run of the track belt cooperates with the truck rollers 4, and the upper part of Fig. 3 shows the relative engagement of the track belt and idler 3. It will be noted that the track for the rollers 4 is afforded by two endless rail belts 9 and 10 which are retained at the proper transverse spacing from each other by a series of track shoes 11 to which they are secured and which in turn are flexibly connected with each other by the rail belts 9 and 10. The rail belts are made of rubber or rubber like material molded around a set of endless steel cables, as shown in Fig. 3, four cables 12 being shown embedded in the belt 9, and four cables 13 being shown embedded in the belt 10. Also embedded in the belt 9 are a series of cross clips 14, corresponding in number to the number of track shoes, each clip having an ear at one side of the rail belt 9 and another ear at the opposite side of the belt for connection with the track shoe 11 by means of rivets 15. The belt 10 has cross clips 14 the same as the belt 9 for connection with the track shoes by means of rivets 15. A guide lug 16 is secured to each track shoe 11 in the space between the rail belts 9 and 10 by means of the rivets 15 at the relatively opposed sides of the belts.

Each truck roller 4 has a pair of solid rubber tires 17 and 18 adapted to roll on the rail belts 9 and 10, respectively, and each truck roller also has a pair of guide flanges 19 and 20 straddling the guide lugs 16 to limit lateral displacement of the track belt 6 relative to the truck rollers 4, and vice versa.

The idler 3 comprises a hub sleeve 21 and relatively spaced rims 22 and 23 connected with the hub sleeve 21 by spokes 24. The rim 22 has a peripheral lining 25 of rubber or rubber like material for engagement with the rail belt 9, and the rim 23 has a similar peripheral lining 26 for engagement with the rail belt 10. When the track belt 6 passes the idler 3 the rail belts 9 and 10 bear upon the linings 25 and 26, respectively, and the guide lugs 16 enter between the rims 22, 23, the relatively opposed edges of the rims being suitably beveled as shown to guide the belt into proper engagement with the idler. An ice breaker 27 in the form of a disk is mounted between the rims 22 and 23.

The hub sleeve 21 of the idler 3 is rotatably mounted on a tubular shaft 28 by means of ball bearings 29 and 30, the shaft 28 extending at its opposite ends beyond the hub sleeve 21 and being internally reinforced at its opposite ends by collars 31, as shown in Figs. 3 and 6. The shaft 28 is mounted on the truck frame 1 for movement in track tensioning and track releasing directions by means of two hangers 32 and 33 one on each side of the idler 3. The hanger 32 is swingably suspended at one end of a square tubular beam 34 of the truck frame 1 by means of a pivot 35, so that the hanger can freely swing in a fore and aft direction relative to the truck frame about the axis of the pivot 35. The hanger 33 is similarly swingable about the axis of a pivot 36 mounted in alinement with the pivot 35 at the end of a square tubular beam 37 (Fig. 3) of the truck frame 1. The hangers 32 and 33 have eyes at their upper ends within the beams 34 and 37, respectively, and the pivots 35 and 36 which extend through the eyes are nonrotatably mounted on the beams and are retained against axial displacement by heads and nuts as shown in Fig. 3. The bottom walls of the beams 34 and 37 are cut away for some distance to permit unobstructed swinging movement of the hangers about the pivots 35 and 36 within a relatively wide range.

The opposite, reinforced ends of the shaft 28 are fitted into large eyes of the hangers 32 and 33, and the shaft is secured against rotary and axial displacement relative to the hangers by set screws 38 and 39. Referring to Fig. 6, the hanger 33 has a boss 40 with a tapped hole in it to receive the set screw 39, and the tapered end of the set screw extends into a tapered hole of the reinforced end of the shaft 28. A nut on the set screw is drawn up against the boss 40 to lock it after the tapered end has been wedged tightly into the tapered hole of the shaft. The same explanations apply to the set screw 38 shown in Fig. 2.

Resilient backing means for the idler 3 are interposed between the hanger 32 and a diagonal brace 41 of the truck frame 1 at one side of the idler, and said backing means are duplicated at the other side of the idler as shown in Fig. 3. Referring to Figs. 2 and 4, the diagonal brace 41 is made of square tubing, and a U-clip 42 is rigidly secured, as by welding, to the under side of the brace 41 in horizontally and vertically spaced relation to the pivot 35 of the hanger 32. The downwardly extending legs of the U-clip have alined holes for the reception of a cap screw 43 which has a head at one side of the U-clip and a castle nut 44 at the other. A bracket comprising a pair of identical triangular plates 45 and 46 is pivotally mounted on the U-clip 42 by means of the cap screw 43, the triangular plate 45 being received between the castle nut 44 and one leg of the U-clip, and the plate 46 being received between the head of the cap screw 43 and the other leg of the U-clip. The castle nut is adjusted on the screw 43 and retained by a cotter pin 47 in such a position that the plates 45, 46 may swing about the axis of the cap screw 43 substantially without binding on the U-clip 42.

Swinging movement of the bracket 45, 46 about the axis of the cap screw 43 in a clockwise direction, as viewed in Fig. 2, is limited by an eye bolt 48. A pin 49 extending through the eye of bolt 48 is mounted in alined holes of the plates 45, 46 at a fixed distance from the axis of the screw 43, and the shank of the eye bolt extends through the brace 41, oversize holes for the shank of the eye bolt being formed in the top and bottom walls of the brace 41, and the top wall being reinforced by an angle plate 50 which is welded to the brace 41. A stop nut 51 and a lock nut 52 are screwed upon the end of the eye bolt 48 which projects beyond the plate 50 at the upper side of the brace 41, and the stop and lock nuts are drawn up tight against each other so that they will be retained in adjusted position longitudinally of the bolt 48. Engagement of the stop nut 51 with the angle plate 50 limits swinging movement of the bracket 45, 46 about the axis of screw 43 in a clock wise direction, as viewed in Fig. 2, and the limit of said clockwise swinging movement of the bracket 45, 46 may be varied by adjustment of the nuts 51, 52 longitudinally of the bolt 48.

A swivel block 53, best shown in Fig. 4, is mounted on the bracket 45, 46 at a fixed distance from the axes of the cap screw 43 and pin 49, the swivel block 53 having oppositely extending trunnions journaled in alined holes of the plates 45 and 46. Cotter pins and washers on the trunnions at the outer sides of the plates 45, 46 keep the plates from spreading. The portion of the swivel block between the plates 45 and 46 has a smooth bore 54 which extends transversely of the trunnion axis, the bore 54 affording a passage for a relatively long rod 55 which is supported within the bore 54 for longitudinal sliding movement relative to the swivel block in the direction of the axis of the bore 54. One end of the rod 55 is threaded to receive a castle nut 56, the threaded portion of the rod, in the position of the mechanism shown in Fig. 2, extending beyond the nut 56 through the swivel block 53 and terminating at some distance from the swivel block at the side of the latter remote from the nut 56. The other end of the rod 55 has a relatively deep counterbore 57 for reception of a stem 58 which is slidably fitted into the counterbore for back and forth movement relative to the rod in the direction of its axis. The stem 58 is rigidly connected with a bifurcated head 59 which is pivotally connected with the hanger 32, an eye 60 integral with the hanger 32 being straddled by the prongs of the head 59, and a pin 61 extending through the prongs of the head 59 and through the eye 60.

A portion of the rod 55 between the swivel block 53 and the head 59 is surrounded by a tube 62 whose inside diameter is slightly larger than the outside diameter of the rod 55 so that the rod 55 may slide in the direction of its axis relative to the tube 62. The swivel block 53 affords a seat for one end of the tube 62, against which seat the tube is normally urged under considerable pressure as will now be described.

At the counterbored portion of the rod 55 which telescopically engages the stem 58, a collar 63 is rigidly secured, as by welding, to the rod 55, the collar being spaced some distance from the end face of the rod which is abuttable by the head 59. As shown in Figs. 2 and 5, the collar 63 has a central hole through which the rod 55 extends, and a circular boss 64 is formed on the collar at the side thereof facing the tube 62. A flange 65 extending radially from the boss 64 has flats 66 for the purpose of holding the rod 55 by means of a wrench against rotation when the nut 56 is screwed upon the threaded end of the rod during assembly and when an adjustment is to be made by turning of the nut 56. Another collar 67 having a central circular boss 68 and a flange 69 is rigidly secured, as by welding, to the tube 62, the collar 67 being spaced a suitable distance from the end of the tube 62 which abuts the swivel block 53, so as to permit swinging movement of the rod 55 and tube 62 about the trunnion axis of the swivel block 53 without interference of the collar 67 with the bracket 45, 46. Reacting between the collars 63 and 67 are two coil springs, an outer one 70 which is made of relatively heavy wire and which bears against the flanges 65 and 69, and an inner one 71 which is made of somewhat lighter wire and bears against the bosses 64 and 68. The bosses 64, 68 also serve to keep the outer coil spring 70 centered relative to the inner coil spring which in turn is centered on the boss 68 by the tube 62.

The distance between the relatively opposed faces of the flanges 65 and 69 as shown in Fig. 2 is substantially shorter than the free length of the outer coil spring 70, the length A of the threaded portion of the rod 55 indicated in Fig. 2, representing approximately the difference between the free length of the coil spring 70 and the spacing at which the relatively opposed faces of the flanges 65 and 69 are shown in Fig. 2. Similarly, the distance between the relatively opposed faces of the bosses 64 and 68 as shown in Fig. 2 is substantially shorter than the free length of the inner coil spring 71, the length A of the threaded portion of the rod 55 indicated in Fig. 2, again representing approximately the difference between the free length of the inner coil spring 71 and the spacing at which the relatively opposed faces of the bosses 64 and 68 are shown in Fig. 2. It will be seen that in the position of the mechanism shown in Fig. 2 the coil springs 70, 71 are preloaded and that the tube 62 is urged against the swivel block 53 in one direction while the nut 56 is urged against the swivel block 53 in the opposite direction. For purposes of assembly the nut 56 may be started on the threads of the rod 55 while the coil springs are entirely or substantially extended to their free lengths, and the springs may then be preloaded to the desired extent by screwing the nut 56 up on the rod 55.

The outer spring 70 is made of relatively heavy wire, as stated, and said wire is of such size that a relatively strong force is necessary in order to deflect the spring to the condition in which it is shown in Fig. 2. However, the spring 70, as shown, has a relatively large number of turns and the coil diameter is likewise relatively large, so that the spring 70 will deflect at a relatively high rate in proportion to a deflecting load. In other words, while the spring 70 is capable of exerting considerable pressure upon deflection, it has a relatively large gradient of deflection. The inner spring 71 is made of somewhat lighter wire than the outer spring 70, as stated, and its coil diameter is substantially smaller than the coil diameter of the outer spring 70. The number of turns of the inner spring is approximately the same as that of the outer spring, and the size of the wire from which the inner spring is made is such that deflection of the inner spring to the preloaded condition in which it is shown in Fig. 2 requires a relatively strong force comparable with the force which is required, as mentioned, to deflect the outer spring to its preloaded condition. Like the outer spring, the inner spring is capable of exerting considerable pressure upon deflection, and like the outer spring it has a relatively large gradient of deflection. Generally stated, the two coil springs 70, 71 represent a relatively strong spring unit which has a relatively large gradient of deflection, and the rod 55, collars 63, 67, and nut 56 constitute means for preloading said spring unit. The rod 55 has a number of holes 72 in its threaded portion, and a cotter pin 73 may be passed through any of these holes for locking the castle nut 56 in different positions of adjustment along the rod 55.

A relatively weak coil spring 74, made of flat wire coiled on edge, is interposed between the collar 63 and the head 59, the opposite ends of the spring 74 bearing against relatively opposed faces of the collar 63 and of the head 59, respectively. The hanger 32 is swingable about the axis of the pivot 35 within a relatively wide range, as stated, and said range is such that the idler 3 could move from the position in which it is shown in Figs. 1 and 2 to an appreciable extent in track tensioning direction upon severance or removal of the track belt 6, before the hanger 32 would reach its limit of movement in said direction. In the position of the parts as shown in Figs. 1 and 2 the spring 74 is in a state of compression, and upon severance or removal of the track belt 6 the spring 74 would expand to its free length and move the idler 3 in track tensioning direction from the position in which it is shown in Figs. 1 and 2. The wire size, the coil diameter and the number of turns of the coil spring 74 are such that the expanding pressure exerted by the spring in its mentioned state of compression upon the collar 63 and the head 59 is substantially smaller than the thrust exerted by the preloaded coil springs 70, 71 against the collar 63 and which thrust is taken up on the swivel block 53 by the nut 56. For instance, the thrust exerted by the preloaded coil springs 70, 71 may be twice as high as the expanding pressure exerted by the coil spring 74 in its mentioned state of compression. The coil spring 74 is further proportioned to have a relatively small gradient of deflection as compared with the gradient of deflection of the spring unit 70, 71, that is, the coil spring 74 is so proportioned that it will deflect at a relatively low rate in proportion to a deflecting load, and upon severance or removal of the track belt 6 the idler 3 would therefore be moved only a relatively small distance in track tensioning direction by the coil spring 74. On the other hand, a relatively short movement of the idler 3 in track releasing direction from the position in which it is shown in Figs. 1 and 2 would cause a substantial increase of the expanding pressure of the spring 74 due to its mentioned low gradient of deflection.

From the foregoing explanations, it will be seen that the resilient unit incorporating the coil springs 70, 71 and the resilient unit incorporating the coil spring 74 have different yielding characteristics, the resilient unit incorporating the coil spring 74 being more readily deflectable than the resilient unit incorporating the coil springs 70, 71.

Generally stated, the resilient unit incorporating the coil springs 70, 71 represents first resilient means associated with the frame 1 in thrust transmitting relation thereto, and the resilient unit incorporating the coil spring 74 represents other resilient means which are mounted for movement with the idler 3 and are arranged in tandem relation with the first resilient means.

Figs. 1 and 2 show the endless track mechanism in the condition which it assumes when the vehicle is at rest and the transmission chain 7 is relieved of driving power. In that condition the idler 3 occupies a normal track tensioning limit position, as shown in Figs. 1 and 2, and it will be noted that the end face of the rod 55 which is abuttable by the head 59, and the face of the head 59 opposite to said end face of the rod 55 are spaced from each other a certain distance indicated at B in Fig. 2. The strong expanding pressure of the spring unit 70, 71 is taken up at the swivel block 53, as stated, and the relatively light expanding pressure of the coil spring 74 urges the idler 3 in track tensioning direction and balances the pressure to which the idler 3 is subjected in track releasing direction due to the unsupported weight of the upper run of the track belt 6. It will thus be seen that the track belt 6 is operative to determine the normal track tensioning limit position in which the idler 3 is shown in Figs. 1 and 2, and that in the condition of the mechanism as shown in said figures, the track belt 6 is maintained under an initial tension the extent of which is determined solely by the expanding pressure of the coil spring 74.

It will further be noted that the rod 55 and the head 59 on the stem 58 represent stop means operable to limit deflection of the more readily deflectable resilient element 74. The rod 55 with its associated head 63, and the nut 56 on the rod 55 further provide tensioning means for the resilient elements represented by the coil spring 70, 71, and said tensioning means are operative to preload the resilient elements 70, 71 independently of the resilient element represented by the coil spring 74 while the idler 3 is in its track tensioning limit position as shown in Figs. 1 and 2.

Assuming now that the vehicle is to be started under a relatively heavy drawbar load, and that propelling power is transmitted for that purpose through the transmission chain 7 to the sprocket 2 so as to rotate the sprocket in the direction of the arrow indicated in Fig. 1. In that case the track belt 6 becomes subject to a driving stress which is substantially higher than the initial tension of the track belt set up by the coil spring 74, and the spring 74 will therefore yield and the idler 3 will move from its normal track tensioning limit position in track releasing direction. The expanding pressure of the coil spring 74 which causes the initial track tension is substantially smaller, as stated, than the thrust exerted by the preloaded spring unit 70, 71 against the collar 63, and said thrust of the spring unit 70, 71 is strong enough so that it will urge the nut 56 firmly against the swivel block 53 not only while the collar 63 is subject to the expanding pressure of the spring 74 which causes the initial track tension, but also while the pressure exerted by the spring 74 upon the collar 63 increases due to the mentioned track releasing movement of the idler 3. The stem 58 will therefore slide within the counterbore 57 of the rod 55, upon the mentioned track releasing movement of the idler 3 and the distance B will become smaller. However, the distance B, as indicated, is relatively short at the outset, and the head 59 will therefore engage the end face of the rod 55 after a relatively short movement of the idler in track releasing direction. Upon engagement of the head 59 with the end face of the rod 55 further movement of the idler 3 in track releasing direction would necessitate deflection of the preloaded spring unit 70, 71. The spring unit 70, 71, however, is preloaded to such an extent that it will not yield under the pressure which is exerted by the spring 74 upon the collar 63 and by the head 59 upon the rod 55 when the track belt 6 is subjected to the driving stress which is necessary for developing the full drawbar pull of the vehicle. Accordingly, when the vehicle is started to pull a heavy load the head 59 first moves into engagement with the end face of the rod 55, and after a correspondingly short movement of the idler 3 in track releasing direction from the position in which it is shown in Figs. 1 and 2, driving stress is permitted to build up in the track belt against the action of the preloaded spring unit 70, 71 until the vehicle starts to move. The function is the same when the vehicle is started abruptly under a relatively light load or whenever the drawbar load is such as to require a sufficiently high driving stress in the track belt to force the head 59 against the end face of the rod 55.

Movement of the idler 3 from the position in which it is shown in Figs. 1 and 2 to the position in which the head 59 engages the end face of the rod 55 causes a shortening of the center distance between the sprocket 2 and the idler 3, and the lower run of the track belt will therefore slacken. The distance B in Fig. 2 is short enough to keep said slack of the track belt at a proper limit so as to avoid derailment of the truck rollers. The upper run of the track belt is held taut regardless of the shortening of the center distance because it is under driving stress. During starting and while pulling a heavy load the driving stress in the upper run of the track belt is relatively high, as stated, and while the upper run is under said high driving stress and as long as the vehicle is moving slowly, the upper run of the track belt will have no tendency to whip up and down. However, when the vehicle is driven at a relatively high speed, say between 30 and 40 miles per hour, centrifugal and other forces acting upon the track belt tend to induce whipping of the upper run of the track belt. Due to the provision of the coil spring 74 such up and down whipping of the upper run of the track belt under the mentioned conditions is suppressed before it reaches an undesirable or objectional amplitude. The spring 74 has a relatively low gradient of deflection, as stated, with the result that its expanding pressure varies materially upon relatively short deflections of the spring, and the effect of the spring 74 is to dampen vertical oscillations of the upper run of the track belt.

While the vehicle is operated, changing driving conditions cause the idler 3 to move back and forth against the action of the coil spring 74 more or less continuously. The driving stress in the upper run of the track belt may at times be high enough to force the head 59 against the end face of the rod 55, and at other times, for instance when coasting, the head 59 may be forced out of engagement with the end face of the rod 55 by the expanding pressure of the coil spring 74. During the mentioned back and forth movement of the idler the rod 55 may become subject to impact by the head 59 more or less violently. These operating characteristics of the mechanism are desirable and have a beneficial effect because they impede the packing of mud and the formation of an ice crust around the hanger 32 and around the springs 70, 71 and 74, which would inhibit operation of the mechanism or prevent it from working when a stone or like obstruction becomes lodged between the track belt and one of the wheels. Similarly, the pivot joints at 35 and 61 and the sliding joint of the counterbored end of the rod 55 with the stem 58 are not liable to become stuck, as by rust.

Assuming that a stone on the lower run of the track belt is drawn into engagement with the idler 3 and is forced to pass with the track belt around the idler 3. In that case the head 59 will be urged into engagement with the end face of the rod 55, if it is not already so engaged, and the track tension rises to the point where the preloaded spring unit 70, 71 begins to yield. The spring unit 70, 71, as stated, has a relatively large gradient of deflection, and it will therefore yield to the necessary extent for letting the stone pass around the idler, while the expanding pressure of the spring unit 70, 71 rises only a relatively small amount beyond the pressure to which it is preloaded under normal conditions.

It will be noted that the hanger 32 and the rod 55 form two links of a toggle mechanism through which the preloaded spring unit 70, 71 is deflected when the idler 3 is forced in track releasing direction beyond the point at which the head 59 engages the end face of the rod 55.

Designating the hanger 32 as a first link of said toggle mechanism, and the rod 55 has a second link, it will be noted that the first link 32 is pivotally mounted on the frame 1 at 35, and that the second link 55 is mounted on the frame 1 for pivotal and translatory movement relative thereto, the rod 55 being pivotally movable together with the swivel block 53 relative to the frame 1 about the trunnion axis of the swivel block 53, and translatory movement of the rod 55 relative to the frame 1 being afforded by the slidable mounting of the rod 55 in the bore 54 of the swivel block 53, as has been explained hereinbefore.

It will further be noted that the connection between the first link 32 and the second link 55 by means of the stem 58 and its associated head 59 provides for pivotal and translatory movement of the second link 55 relative to the first link 32. The stem 58 and its associated head 59 constitute, in effect, a third link of the mentioned toggle mechanism, and said third link is pivotally connected with the first link 32 at 61 and has a sliding connection at 57 with the second link 55.

A line through the axis of the joint 35 and through the trunnion axis of the swivel block 53 represents the dead center line of the mentioned toggle mechanism, and when the spring 74 yields, the pivot pin 61 moves towards said dead center line, and upon subsequent yielding movement of the spring unit 70, 71 the pivot pin 61 continues to approach said dead center line. The hanger 32 and rod 55, therefore, have a force multiplying effect upon the spring unit 70, 71, and while the expanding pressure of the spring unit 70, 71 rises at a relatively low rate, as stated, upon deflection of said spring unit, the effective force upon the hanger 32 which restrains the idler 3 from moving beyond the point at which the head 59 engages the end face of the rod 55, rises at a still lower rate.

Operation of the vehicle will cause a certain wear of the faces of the rail belts 9 and 10 which cooperate with the truck rollers 4 and with the idler 3; of the tires of the truck wheels 4; of the linings 25 and 26 of the idler 3; and of the cooperating parts of the drive sprocket 2 and of the track belt 6. Also, the track belt 6 may become permanently elongated to some extent, as by permanent elongation of the cables 12 and 13 under the driving stresses. Such wear and elongation will be compensated for automatically, by the coil spring 74, at least to the extent of making frequent readjustments of the mechanism unnecessary. If the mentioned causes make a readjustment necessary this can be accomplished conveniently by readjustment of the nuts 51, 52, independently of or in conjunction with a readjustment of the nut 56. Adjustment of the nuts 51, 52 independently of the nut 56 affects only the distance B in Fig. 2, and adjustment of the nut 56 independently of the nuts 51, 52 affects the preloading of the coil springs 70, 71 and also the distance B. Obviously, the springs 70, 71 and 74 can be adjusted to exert their desired pressures, by adjustment of the nuts 51, 52 and 56. The pressure condition of the spring 74 and, therefore, the initial tension of the track belt can be conveniently checked by measuring the distance C in Fig. 2 between the relatively opposed faces of the collar 63 and of the head 59.

While in the foregoing a preferred embodiment of the invention has been disclosed it should be understood that it is not intended to limit the invention to the exact design and details of construction herein described and shown for various modifications within the scope of the appended claims may occur to persons skilled in the art.

It is claimed and desired to secure by Letters Patent:

1. In a self-laying track mechanism of the type in which a structure for operatively mounting an endless track belt comprises a frame and a track engaging wheel mounted on said frame for movement relative thereto in track tensioning and track releasing directions, and in which said track belt is operative to determine a normal track tensioning limit position of said wheel, the combination of first resilient means associated in thrust transmitting relation with said frame, second resilient means having a yielding characteristic different from that of said first resilient means, and means mounting said second resilient means for movement with said wheel relative to said frame and in tandem relation with said first resilient means.

2. In a self-laying track mechanism of the type in which a structure for operatively mounting an endless track belt comprises a frame and a track engaging wheel mounted on said frame for movement relative thereto in track tensioning and track releasing directions, and in which said track belt is operative to determine a normal track tensioning limit position of said wheel, the combination of first resilient means associated in thrust transmitting relation with said frame, second resilient means mounted for movement with said wheel relative to said frame and arranged in tandem relation with said first resilient means, one of said resilient means being deflectable more readily than the other, and stop means operable to limit deflection of said more readily deflectable resilient means upon movement of said wheel from said limit position in track releasing direction.

3. In a self-laying track mechanism of the type in which a structure for operatively mounting an endless track belt comprises a frame and a track engaging wheel mounted on said frame for movement relative thereto in track tensioning and track releasing directions, and in which said track belt is operative to determine a normal track tensioning limit position of said wheel, the combination of first resilient means associated in thrust transmitting relation with said frame, second resilient means mounted for movement with said wheel relative to said frame and arranged in tandem relation with said first resilient means, and tensioning means for one of said resilient means effective to preload said one resilient means independently of the other while said wheel is in said limit position.

4. In a self-laying track mechanism of the type in which a structure for operatively mounting an endless track belt comprising a frame and a track engaging wheel mounted on said frame for movement relative thereto in track tensioning and track releasing directions, and in which said track belt is operative to determine a normal track tensioning limit position of said wheel, the combination of first resilient means associated in thrust transmitting relation with said frame, second resilient means mounted for movement with said wheel relative to said frame and arranged in tandem relation with said first resilient means, tensioning means for one of said resilient means effective to preload said one resilient means independently of the other while said wheel is in said limit position, and stop means operable to limit deflection of said other resilient means upon movement of said wheel from said limit position in track releasing direction.

5. In a self-laying track mechanism of the type in which a structure for operatively mounting an endless track belt comprises a frame and a track engaging wheel mounted on said frame for movement relative thereto in track tensioning and track releasing directions, and in which said track belt is operative to determine a normal track tensioning limit position of said wheel, the combination of a first resilient element associated in thrust transmitting relation with said frame, a second resilient element deflectable more readily than said first resilient element, and means mounting said second resilient element for movement with said wheel relative to said frame and in tandem relation with said first resilient element.

6. In a self-laying track mechanism of the type in which a structure for operatively mounting an endless track belt comprises a frame and a track engaging wheel mounted on said frame for movement relative thereto in track tensioning and track releasing directions, and in which said track belt is operative to determine a normal track tensioning limit position of said wheel, the combination of a first resilient element associated in thrust transmitting relation with said frame, a second resilient element deflectable more readily than said first resilient element, means mounting said second resilient element for movement with said wheel relative to said frame and in tandem relation with said first resilient element, and relatively movable stop means associated, respectively, with said first resilient element and with said wheel and movable into cooperative engagement with each other to limit deflection of said second resilient means upon movement of said wheel from said limit position in track releasing direction.

7. In a self-laying track mechanism of the type in which a structure for operatively mounting an endless track belt comprises a frame and a track engaging wheel mounted on said frame for movement relative thereto in track tensioning and track releasing directions, the combination of a first resilient element, means mounting said first resilient element in initially deflected condition on said frame and independently of said wheel, a second resilient element deflectable more readily than said initially deflected first resilient element, and means mounting said second resilient element for movement with said wheel relative to said frame and in tandem relation with said initially deflected first resilient element.

8. In a self-laying track mechanism of the type in which a structure for operatively mounting an endless track belt comprises a frame and a track engaging wheel mounted on said frame for movement relative thereto in track tensioning and track releasing directions, the combination of a first resilient element, means mounting said first resilient element in initially deflected condition on said frame and independently of said wheel, a second resilient element deflectable more readily than said initially deflected first resilient element, means mounting said second resilient element for movement with said wheel relative to said frame and in tandem relation with said initially deflected first resilient element, and relatively movable stop means associated, respectively, with said first resilient element and with said wheel and movable into operative engagement with each other to limit deflection of said more readily deflectable resilient element upon movement of said wheel relative to said frame in track releasing direction.

9. In a self-laying track mechanism of the type in which a structure for operatively mounting an endless track belt comprises a frame and a track engaging wheel mounted on said frame for movement relative thereto in track tensioning and track releasing directions, the combination of a first link member rotatably mounting said wheel and pivoted on said frame, a second link member mounted on said frame for pivotal and translatory movement relative thereto, means connecting said second link member with said first link member for pivotal and translatory movement of said second link member relative to said first link member, and first and second resilient elements mounted to react, respectively, between said frame and said second link member, and between said first and second link members, and effective to yieldingly oppose movement of said wheel relative to said frame in track releasing direction.

10. In a self-laying track mechanism of the type in which a structure for operatively mounting an endless track belt comprises a frame and a track engaging wheel mounted on said frame for movement relative thereto in track tensioning and track releasing directions, the combination of a first link member rotatably mounting said wheel and pivoted on said frame, a second link member mounted on said frame for pivotal and translatory movement relative thereto, a third link member pivoted on said first link member and slidably connected with said second link member, and first and second resilient elements having different yielding characteristics and mounted to react, respectively, between said frame and said second link member, and between said second and third link members, and effective to yieldingly oppose movement of said wheel relative to said frame in track releasing direction.

11. In a self-laying track mechanism of the type in which a structure for operatively mounting an endless track belt comprises a frame and a track engaging wheel mounted on said frame for movement relative thereto in track tensioning and track releasing directions, the combination of a link member rotatably mounting said wheel and pivoted on said frame, a bracket mounted on said frame for pivotal movement relative thereto independently of said link member, means associated with said bracket and cooperable with said frame for pivotally adjusting said bracket relative to said frame, and tandem connected first and second resilient means having different yielding characteristics, operatively interposed between said bracket and said link member and effective to yieldingly oppose movement of said wheel relative to said frame in track releasing direction.

12. In a self-laying track mechanism of the type in which a structure for operatively mounting an endless track belt comprises a frame and a track engaging wheel mounted on said frame for movement relative thereto in track tensioning and track releasing directions, the combination of a first link member rotatably mounting said wheel and pivoted on said frame, a bracket mounted on said frame for pivotal movement relative thereto independently of said first link member, means for pivotally adjusting said bracket relative to said frame, a second link member mounted on said bracket for pivotal and sliding movement relative thereto, a third link member pivoted on said first link member and slidably connected with said second link member, and first and second resilient means operatively interposed, respectively, between said bracket and said second link member and between said second and third link members, and effective to yieldingly oppose movement of said wheel relative to said frame in track releasing direction.

IGOR A. KAMLOOKHINE.

REFERENCES CITED

The following references are of record in the file of this patent:

UNITED STATES PATENTS

| Number | Name | Date |
|---|---|---|
| 1,368,652 | Pennington et al. | Feb. 15, 1921 |
| 1,981,867 | Knox et al. | Nov. 27, 1934 |
| 2,315,421 | Heaslet | Mar. 30, 1943 |